United States Patent
Ryu et al.

(10) Patent No.: US 10,917,863 B2
(45) Date of Patent: Feb. 9, 2021

(54) TECHNIQUES FOR ANTENNA ARRAY SIZE ADAPTATION IN WIRELESS COMMUNICATIONS

(71) Applicant: QUALCOMM Incorporated, San Diego, CA (US)

(72) Inventors: Jung Ryu, Fort Lee, NJ (US); Vasanthan Raghavan, West Windsor Township, NJ (US); Junyi Li, Chester, NJ (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 16/244,383

(22) Filed: Jan. 10, 2019

(65) Prior Publication Data

US 2019/0230606 A1 Jul. 25, 2019

Related U.S. Application Data

(60) Provisional application No. 62/620,222, filed on Jan. 22, 2018.

(51) Int. Cl.
*H04W 52/54* (2009.01)
*H04B 7/02* (2018.01)
(Continued)

(52) U.S. Cl.
CPC .......... *H04W 52/367* (2013.01); *H04B 7/024* (2013.01); *H04B 7/043* (2013.01);
(Continued)

(58) Field of Classification Search
CPC .......... H04W 52/367; H04W 52/0274; H04W 52/54; H04B 7/043; H04B 7/0482; H04B 7/04; H04B 5/00; H04B 7/06; H04B 7/00
See application file for complete search history.

(56) References Cited

U.S. PATENT DOCUMENTS

2007/0070927 A1* 3/2007 Shoki ............... H04B 7/0417 370/310
2011/0188586 A1* 8/2011 Bidigare ............ H04B 7/18513 375/260

(Continued)

FOREIGN PATENT DOCUMENTS

CN 106506052 B * 10/2019
GB 2477979 A * 8/2011 ............ H04W 16/28

OTHER PUBLICATIONS

Yu (NPL D1) 2009 Adaptive RF chain management for energy-efficient MIMO, (Year: 2009).*

(Continued)

*Primary Examiner* — Dong-Chang Shiue
(74) *Attorney, Agent, or Firm* — Arent Fox, LLP

(57) ABSTRACT

Aspects of the present disclosure describe configuring a number of antennas in an antenna array to use in communicating in a wireless network. The number of antennas of the antenna array, less than all available antennas for transmission or reception in the antenna array, can be determined such to achieve a radio frequency (RF) power that results in a certain effective data rate for communicating in the wireless network. The number of antennas can be indicated, over a backhaul, to one or more other access points of the wireless network to coordinate using of the number of antennas at a determined time. One or more devices in the wireless network can be communicated with using the number of antennas.

31 Claims, 7 Drawing Sheets

(51) Int. Cl.
  *H04W 52/36* (2009.01)
  *H04B 7/024* (2017.01)
  *H04B 7/06* (2006.01)
  *H04B 7/08* (2006.01)
  *H04B 7/0426* (2017.01)
  *H04B 7/0456* (2017.01)
  *H04W 52/02* (2009.01)

(52) U.S. Cl.
  CPC ......... *H04B 7/0482* (2013.01); *H04B 7/0691* (2013.01); *H04B 7/0874* (2013.01); *H04W 52/0274* (2013.01); *H04W 52/54* (2013.01)

(56) References Cited

U.S. PATENT DOCUMENTS

2012/0128088 A1* 5/2012 Ko ....................... H04B 7/0465 375/260
2014/0307819 A1* 10/2014 Paulraj .............. H04W 28/0215 375/267
2018/0338289 A1* 11/2018 Reial ................. H04W 52/0225
2018/0367190 A1* 12/2018 Liang .................. H04B 7/0413

OTHER PUBLICATIONS

International Search Report and Written Opinion—PCT/US2019/013312—ISA/EPO—dated Apr. 1, 2019
Wenjun X., et al., "Joint Parameter Selection for Massive MIMO: An Energy-Efficient Perspective" IEEE Access, vol. 4. Jul. 15, 2016 (Jul. 15, 2016), pp. 3719-3731, XP011618727, DOI: 10.1109/ACCESS.2016.2591781, [retrieved on Aug. 4, 2016].
Yu H., et al., "Adaptive RF Chain Management for Energy-Efficient Spatial-Multiplexing MIMO Transmission", Proceedings of the 2009 ACM/IEEE International Symposium on Low Power Electronics and Design, Aug. 19-21, 2009, San Francisco, CA, USA, ACM Press, New York, NY, Aug. 19, 2009 (Aug. 19, 2009), pp. 401-406. XP058210703, DOI:10.1145/1594233.1594336, ISBN: 978-1-60558-684-7.

* cited by examiner

TECHNIQUES FOR ANTENNA ARRAY SIZE ADAPTATION IN WIRELESS COMMUNICATIONS

CLAIM OF PRIORITY UNDER 35 U.S.C. § 119

The present Application for Patent claims priority to Provisional Application No. 62/620,222, entitled "TECHNIQUES FOR ANTENNA ARRAY SIZE ADAPTATION IN WIRELESS COMMUNICATIONS" filed Jan. 22, 2018, which is assigned to the assignee hereof and hereby expressly incorporated by reference herein for all purposes.

BACKGROUND

Aspects of the present disclosure relate generally to wireless communication systems, and more particularly, to operating antenna arrays.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, fourth generating (4G) and/or fifth generation (5G) wireless communications technologies have been, or are being, developed to expand and support diverse usage scenarios and applications with respect to current mobile network generations. 5G wireless communications technologies can be defined to use millimeter wave (mmW) systems to facilitate communications among devices in a 5G network.

In addition, in 5G networks, Node Bs (evolved Node Bs (eNBs), gNBs, etc.) and user equipment (UE) can use direction beams to establish initial mmW links by transmitting synchronization signal (SS) blocks. The Node Bs, which may include consumer premises equipment (CPE), may use large antenna arrays (e.g., arrays of 16×4 antennas, 32×4, 32×8, 64×4, 64×8, 128×16, etc.), which can be assembled using smaller modules (e.g., 4×4, 4×2, 2×2, etc. modules) to achieve the full antenna array, as modular construction may simplify the antenna design and/or be more cost effective for mmW.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for configuring a number of antennas in an antenna array to use in communicating in a wireless network is provided. The method includes determining the number of antennas of the antenna array, less than all available antennas for transmission or reception in the antenna array, to achieve a radio frequency (RF) power that results in a certain effective data rate for communicating in the wireless network, indicating, over a backhaul connection, the number of antennas to one or more other access points of the wireless network to coordinate using of the number of antennas at a determined time, and communicating, using the number of antennas, with one or more devices in the wireless network.

In another example, an apparatus for wireless communication is provided that includes a transceiver for communicating in a wireless network via a number of antennas in an antenna array, a memory configured to store instructions, and one or more processors communicatively coupled with the transceiver and the memory. The one or more processors are configured to determine the number of antennas of the antenna array, less than all available antennas for transmission or reception in the antenna array, to achieve a RF power that results in a certain effective data rate for communicating in the wireless network, indicate, over a backhaul connection, the number of antennas to one or more other access points of the wireless network to coordinate using of the number of antennas at a determined time, and communicate, using the number of antennas, with one or more devices in the wireless network.

In yet another example, an apparatus for configuring a number of antennas in an antenna array to use in communicating in a wireless network is provided. The apparatus includes means for determining the number of antennas of the antenna array, less than all available antennas for transmission or reception in the antenna array, to achieve a RF power that results in a certain effective data rate for communicating in the wireless network, means for indicating, over a backhaul connection, the number of antennas to one or more other access points of the wireless network to coordinate using of the number of antennas at a determined time, and means for communicating, using the number of antennas, with one or more devices in the wireless network.

In another example, a computer-readable medium, including code executable by one or more processors for configuring a number of antennas in an antenna array to use in communicating in a wireless network, is provided. The code includes code for determining the number of antennas of the antenna array, less than all available antennas for transmission or reception in the antenna array, to achieve a RF power that results in a certain effective data rate for communicating in the wireless network, code for indicating, over a backhaul connection, the number of antennas to one or more other access points of the wireless network to coordinate using of the number of antennas at a determined time, and code for communicating, using the number of antennas, with one or more devices in the wireless network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
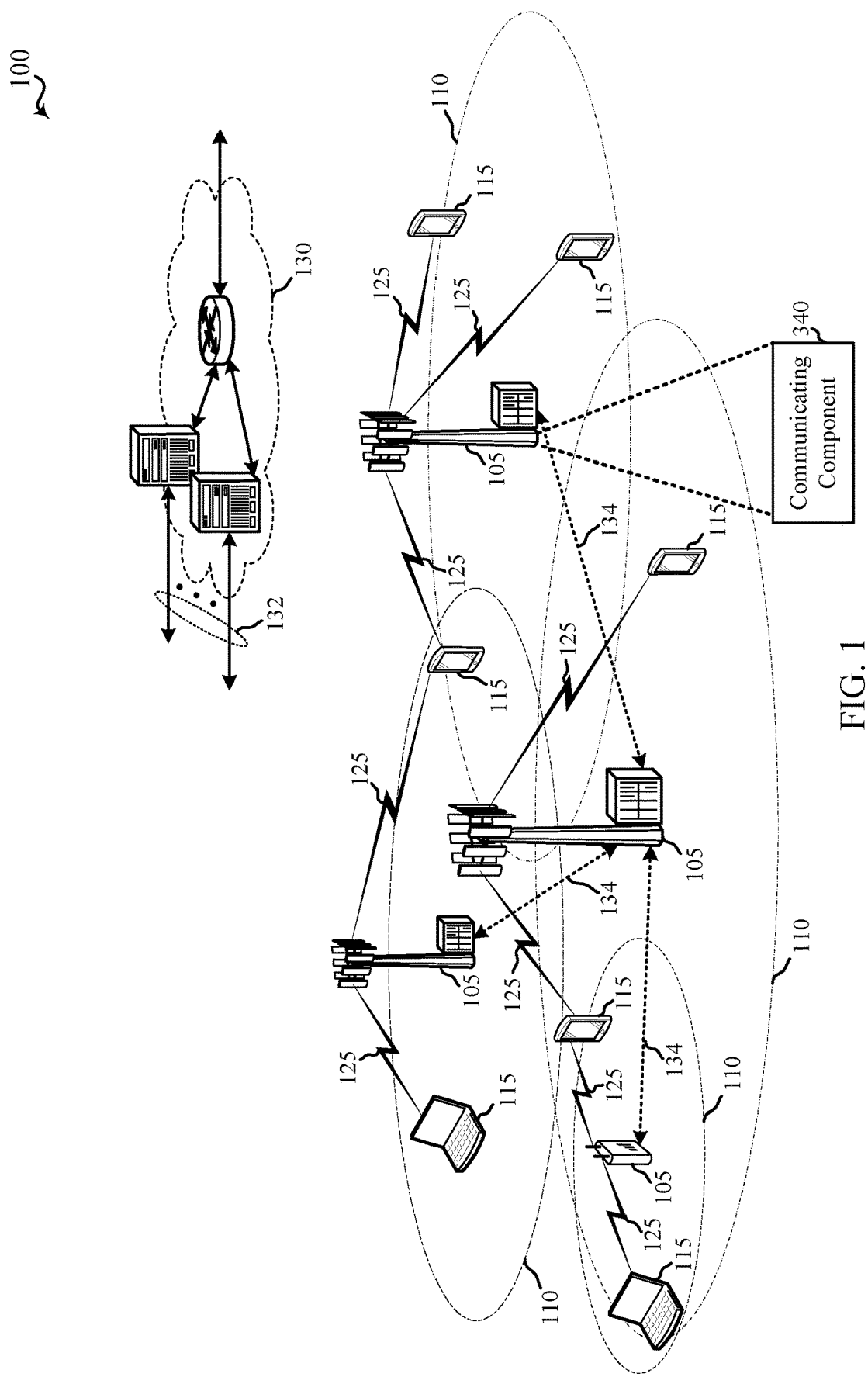
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to techniques for conserving power when using modular antenna structures. For example, wireless communication devices, such as Node Bs, which may include consumer premises equipment (CPE), user equipment (UEs), etc., may use large antenna arrays (e.g., arrays of 16×4 antennas, 32×4, 32×8, 64×4, 64×8, 128×16, etc.), which can be assembled using smaller modules (e.g., 4×4, 4×2, 2×2, etc. modules) to achieve the full antenna array. Using this modular structure with more antennas, however, may result in more radio frequency (RF) and/or modem (MDM) power consumption as different/multiple RF integrated circuits (RFIC) get excited. Accordingly, the wireless communication devices may be configured to select a subset of antennas of an antenna array for communicating with one or more devices in a wireless network, which can enable conserving power consumption by the antenna array, increasing a beamwidth for beamforming signals by the antenna array, etc.

In an example, an effective rate for communicating with the one or more devices can be determined, and a number of antennas to achieve the effective rate can be computed. The wireless communication device communicating with the one or more devices can accordingly select a subset of the antennas in the antenna array to use (e.g., and may terminate power to the other antennas in the antenna array) based on the number of antennas determined for achieving the effective rate. In some examples, the subset of antennas may be selected based on the wireless communication device communicating with other similar nodes in the wireless network (e.g., where the nodes can be Node Bs that serve one or more devices via respective antenna arrays) to exchange information over a backhaul connection. For example, the information can include information to coordinate multiple wireless communication devices being able to use a subset of antennas (e.g., during different periods of time). In another example, the wireless communication device can determine to use the subset of antennas, as opposed to all antennas in its antenna array, based on other considerations (e.g., received parameters or detected conditions) including a network density, UE density (or other device density) at a cell, a time of day (e.g., whether peak or non-peak for network traffic), data payload to be communicated, etc. During times when the other considerations are determined to apply, the wireless communication device can use a subset of the antennas to conserve power and/or increase beamwidth.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1 X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links. In one example, the base stations 105 may communicate with one another as part of an integrated access and backhaul (IAB) network, as described further herein, where a first base station 105 can have an access node function (AN-F) for providing access to a second base station 105 (e.g., over a backhaul link), and the second base station 105 can have both of a UE function (UE-F) to communicate with the first base station 105 (e.g., over the backhaul link) and an AN-F to communicate with another downstream base station 105 (e.g., over another backhaul link) or UE 115 (e.g., over an access link), etc.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), gNB, Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas or antenna elements for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data. As used herein, it is to be appreciated that the term "antenna" can be used to include a single antenna, multiple antennas, a single or multiple antenna elements, or substantially any antenna design. Thus, for example, an array of antennas may include a set of multiple antennas or antenna elements and/or may include a grid arrangement of antennas or antenna elements. It is to be appreciated that substantially any arrangement of antenna(s) may benefit from the concepts described herein. In addition, such arrangements of antennas and/or antenna elements can use a corresponding transmission technique for arrays of antennas/antenna elements, etc.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, one or more of the base stations 105 may include an antenna array that is used for communicating with one or more wireless communication devices, such as UEs 115, another base station 105 over a backhaul link (e.g., a UE-F of the other base station 105), etc. For instance, a base station 105 can include a communicating component 340 for configuring a subset of antennas in the antenna array for communicating with the one or more UEs 115 to conserve power consumption, increase beamwidth, etc. For example, though a macrocell type of base station 105 is shown as including the communicating component 340, substantially any type of access point can include the communicating component 340 (and base station 105 can be the type of access point), such as a consumer premises equipment (CPE) or smaller scale access point. In addition, the communicating component 340 can facilitate communications between the base station 105 and other base stations in the wireless communication system 100 over the backhaul link 134 such to coordinate use of subsets of antennas in certain periods of time and/or based on detected parameters or conditions.

Figure 2:
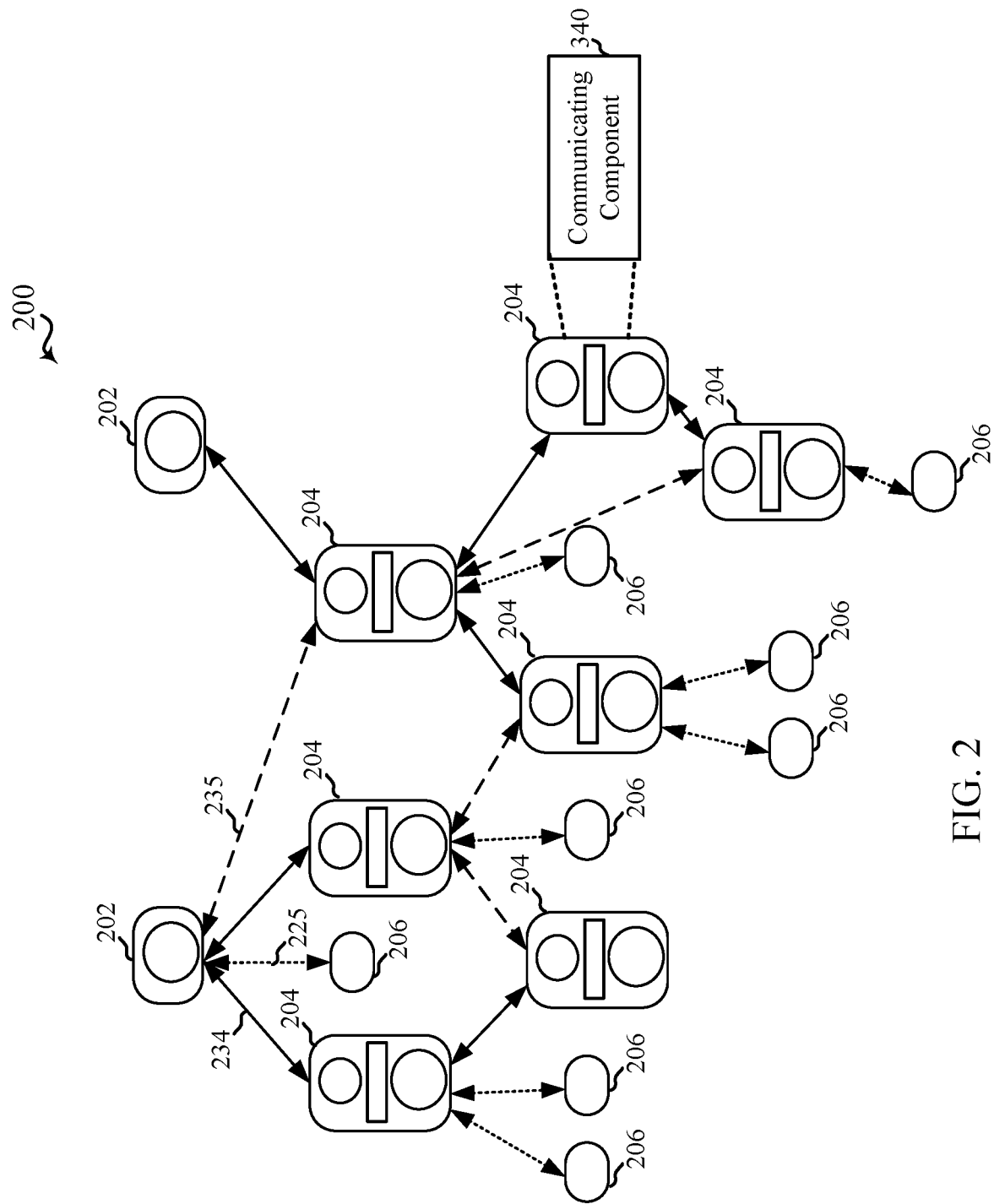
FIG. 2 illustrates an example of a wireless communication system that provides an integrated access and backhaul (IAB) network, in accordance with various aspects of the present disclosure.

Referring to FIG. 2, in accordance with various aspects described herein, an example of another wireless communication access network 200 that can provide an IAB network is depicted. The wireless communication access network 200 can include one or more IAB-donor nodes 202, which may be anchor nodes that may provide a backhaul link for accessing a core network, one or more IAB-nodes 204, which may be relay nodes that may provide a backhaul link for accessing one or more upstream IAB-nodes 204 or IAB-donor nodes 202 and an access link for communication with one or more UEs 206, and one or more UEs 206. The IAB-donor nodes 202 can include a wireline connection to a network and may terminate a Ng interface. The IAB-nodes 204 can provide the AN-F and the UE-F, as described. In this regard, the IAB-nodes 204 can communicate with the IAB-donor node 202 or other upstream IAB-nodes using the UE-F, which is controlled and scheduled by the IAB-donor node 202 or other upstream IAB-node 204 connected as parent nodes, and uses a backhaul link. The IAB-nodes 204 can also communicate with one or more UEs 206 or other downstream IAB-nodes 204 using the AN-F, which schedules the UEs 206 and/or other downstream IAB-nodes 204 connected as child nodes, and controls both access links and backhaul links under its coverage.

In this example in FIG. 2, solid lines can represent backhaul links between nodes, such as backhaul link 234, dashed lines can represent backup backhaul links between the nodes, such as backup backhaul link 235, and dotted lines can represent access links between IAB-nodes 204 (or IAB-donor nodes 202) and UEs 206, such as access link 225. In addition, IAB-nodes 204 (e.g., and/or IAB-donor nodes) can include a communicating component 340 for selecting a subset of antennas of an antenna array for communicating with one or more devices in a wireless network (e.g., with one or more IAB-nodes 204, IAB-donor nodes 202, and/or UEs), which can enable conserving power consumption by the antenna array, increasing a beamwidth for beamforming signals by the antenna array, etc., as described herein.

Figure 3:
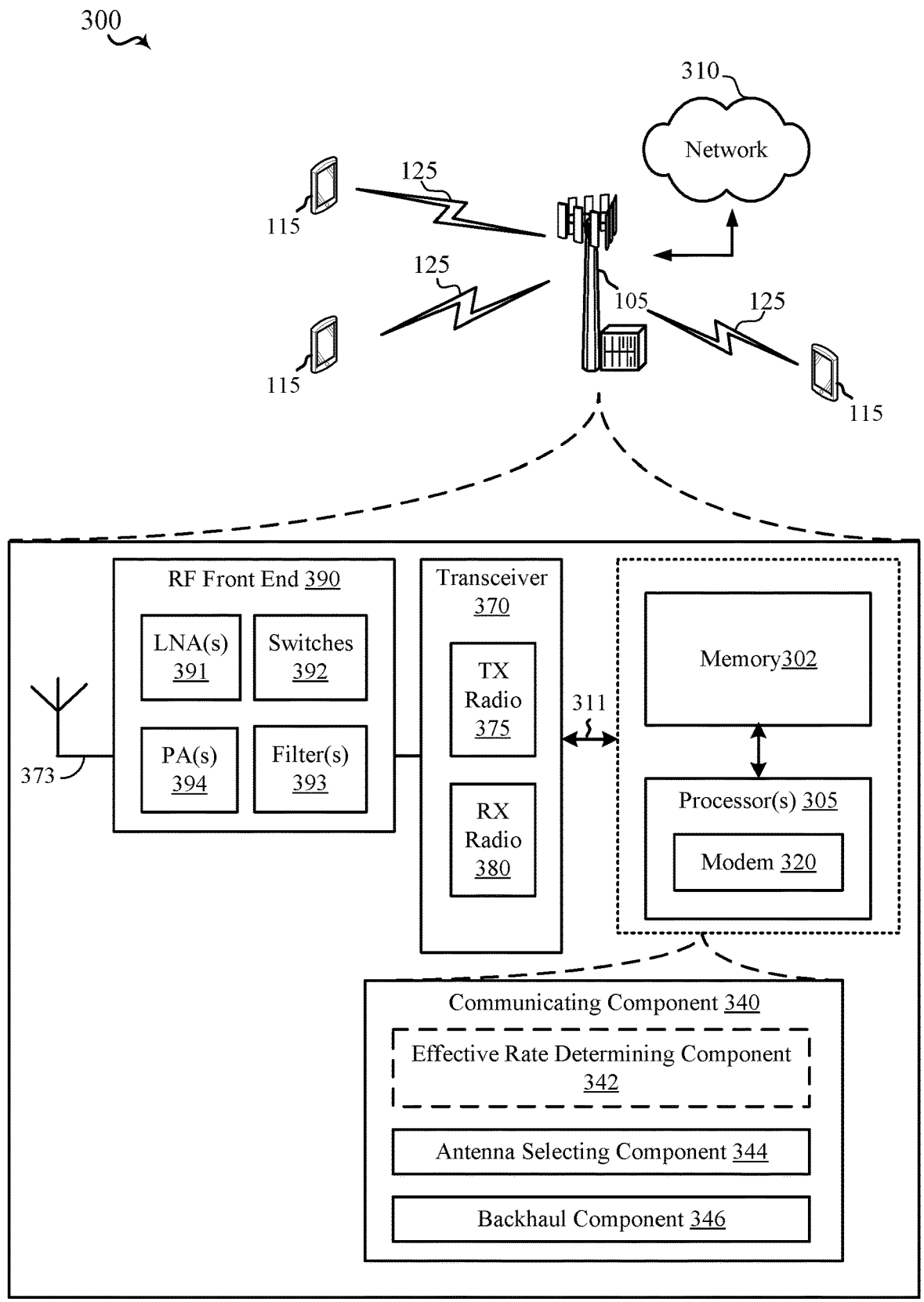
FIG. 3 is a block diagram illustrating an example of a base station, in accordance with various aspects of the present disclosure.
Figure 4:
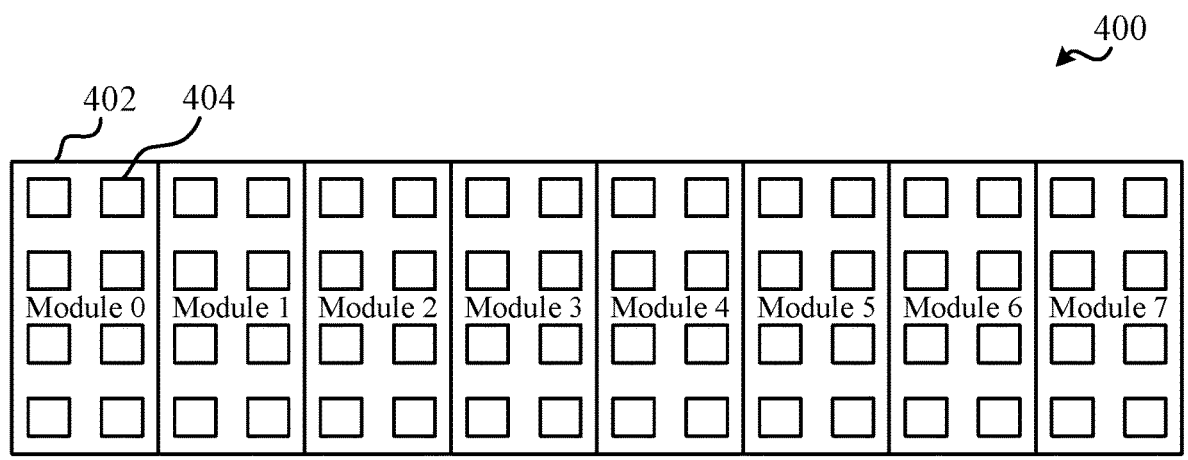
FIG. 4 is a schematic diagram of an example of an antenna array, in accordance with various aspects of the present disclosure.
Figure 5:
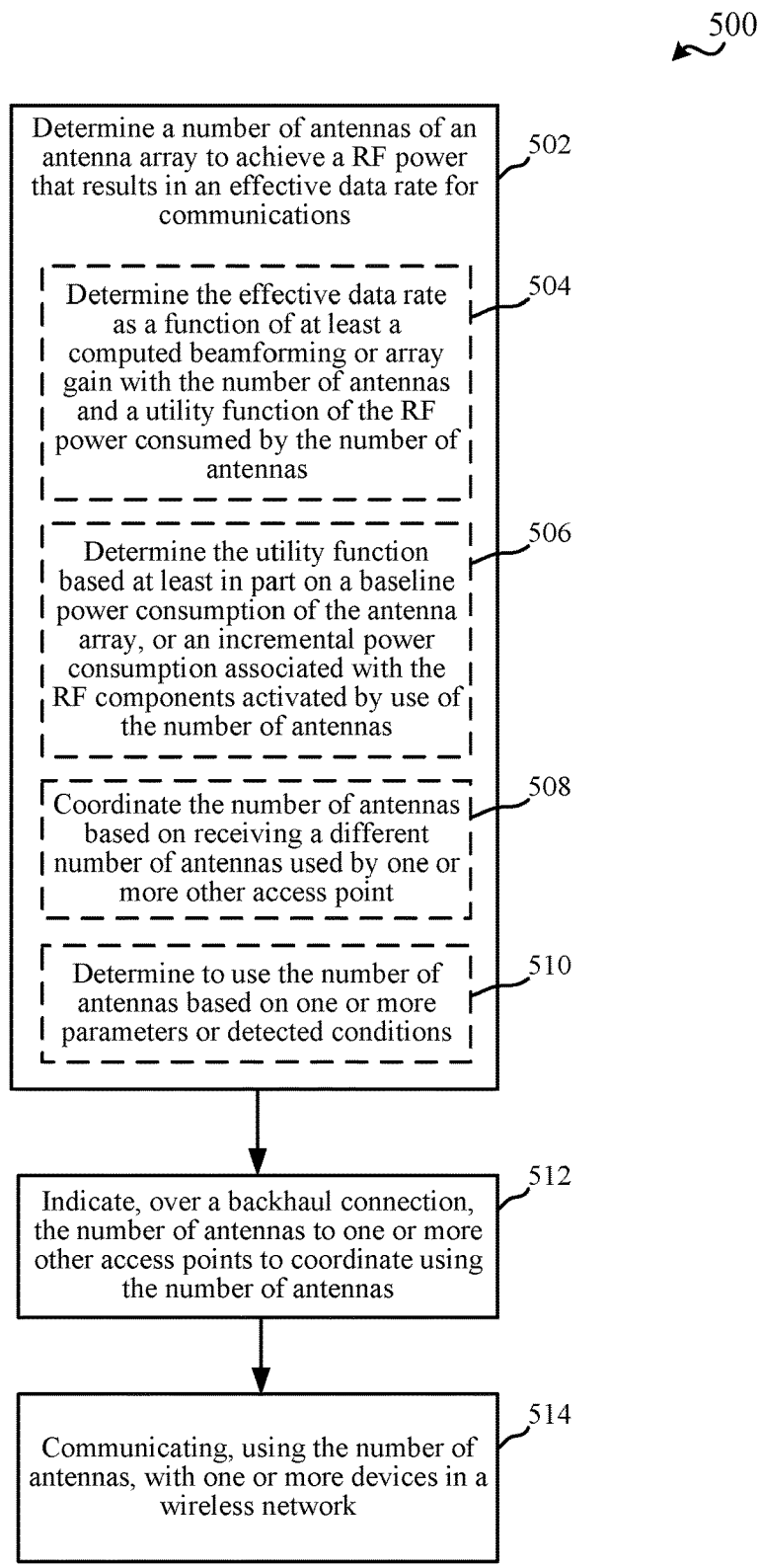
FIG. 5 is a flow chart illustrating an example of a method for selecting antennas of an antenna array to use for wireless communications, in accordance with various aspects of the present disclosure.

Turning now to FIGS. 3-7, aspects are depicted with reference to one or more components and one or more methods that may perform the actions or operations described herein, where aspects in dashed line may be optional. Although the operations described below in FIG. 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 3, a block diagram 300 is shown that includes a portion of a wireless communications system having multiple UEs 115 in communication with a base station 105 via communication links 125, where the base station 105 is also connected to a network 310, which may include one or more components of a core network (e.g., core network 130). The base station 105 may be examples of the base stations described in the present disclosure that are configured to configure UEs with measurement reporting functionality, which may include certain parameters that define when the UE 115 can generate and transmit measurement reports to the base station 105.

In an aspect, the base station 105 in FIG. 3 may include one or more processors 305 and/or memory 302 that may operate in combination with a communicating component 340 to perform the functions, methods (e.g., method 500 of FIG. 5), etc., presented in the present disclosure. In accordance with the present disclosure, the communicating component 340 may include one or more components for selecting a subset of antennas in an antenna array to be used for communicating with one or more UEs 115. In an example, base station 105 can include antenna 373, which may include an array of antennas (also referred to herein as an "antenna array"). For example, communicating component 340 may include an optional effective rate determining component 342 for determining an effective rate desired for communicating with the one or more UEs 115, an antenna selecting component 344 for selecting a subset of antennas in the antenna array to achieve the effective rate, and/or a backhaul component 346 for communicating with one or more other base stations in the network 310 over a backhaul connection and/or associated interface.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340. In another example, communicating component 340, or sub-components thereof, may operate at one or more communication layers, such as physical layer or L1, MAC layer or L2, a PDCP/RLC layer or L3, etc., to configure measurement reporting, associated measurement gaps, etc.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the base station 105 in FIG. 3 may include an RF front end 390 and transceiver 370 for receiving and transmitting radio transmissions to, for example, base stations 105. The transceiver 370 may coordinate with the modem 320 to receive signals that include packets (e.g., and/or one or more related PDUs). RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the base station 105 can communicate with, for example, base stations 105. In an aspect, for example, the modem 320 can configure the transceiver 370 to operate at a specified frequency and power level based on the configuration of the base station 105 and communication protocol used by the modem 320.

The base station 105 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the base station 105 may include a bus 311 for coupling one or more of the RF front end 390, the transceiver 374, the memory 302, or the processor 305, and to exchange signaling information between each of the components and/or sub-components of the base station 105.

In an aspect, the processor(s) 305 may correspond to one or more of the processors described in connection with the base station 105 in FIG. 7. Similarly, the memory 302 may correspond to the memory described in connection with the base station 105 in FIG. 7.

FIG. 4 illustrates an example of an antenna array 400 in accordance with aspects described herein. For example, base station 105 can utilize the antenna array 400 for communicating with one or more devices. In an example, antenna 373 in FIG. 3 can be part of or can otherwise include antenna array 400. As shown, the antenna array can include multiple modules (which can include RF integrated circuit (RFIC) modules, also referred to herein as RF components), such as module 402, each having a number of antennas, such as antenna 404. In the depicted example, the antenna array 400 can be a 16×4 antenna array including 8 2×4 antenna RFIC modules (e.g., in a modular construction). When all the antennas are used, the gain/rate can grow with antenna dimensions. Due to the modular construction, as described however, the more antennas that are used results in more RF and modem (MDM) power consumption as different RFICs get excited. Higher data rates may be achievable at the cost of more power in the antenna array 400, but more power may also lead to increase in operating expenditure (OPEX) of the antenna array 400. In addition, given that synchronization signal (SS) blocks are used for broadcast/common gNB side transmissions, there can be a desirable antenna size, which may not include all antennas/modules, to use at the gNB/CPE for energy efficiency in transmitting wireless communications.

FIG. 5 illustrates a flow chart of an example of a method 500 for determining (e.g., by a base station) a number of antennas in an antenna array to utilize in communicating with one or more devices (e.g., one or more UEs, one or more other base stations, etc.) in a wireless network.

At Block 502, a number of antennas of an antenna array to achieve a RF power that results in an effective data rate for communications can be determined. In an aspect, antenna selecting component 344, e.g., in conjunction with processor(s) 305, memory 302, transceiver 370, communicating component 340, antenna array 373, 400, etc., can determine the number of antennas of the antenna array (which may be less than all antennas in the antenna array) to achieve an RF power that results in an effective data rate for communications. For example, using the number of antennas (e.g., a subset of the antennas and/or corresponding modules), rather than all antennas in the antenna array, can result in lower power consumption, increased beamwidth, etc. by the antenna array.

In one example, determining the number of antennas at Block 502 can optionally include, at Block 504, determining the effective data rate as a function of at least a computed beamforming or array gain with the number of antennas and a utility function of the RF power consumed by the number of antennas (or RF power consumed by individual RF components in RF circuitry activated by the number of antennas in the antenna array). In an aspect, effective rate determining component 352, e.g., in conjunction with processor(s) 305, memory 302, transceiver 370, communicating component 350, antenna array 373, 400, etc., can determine the effective data rate as a function of at least the computed beamforming or array gain with the number of antennas and the utility function of the RF power consumed by the number of antennas. In a specific example, where H can denote the channel (e.g., channel matrix) between the base station 105 (e.g., a gNB) and a certain UE 115, such that:

$$H = \sqrt{\frac{N_r N_t}{L}} \sum_{\ell=1}^{L} \alpha_\ell \cdot a_R(\theta_{R,\ell}, \phi_{R,\ell}) a_T(\theta_{T,\ell}, \phi_{T,\ell})^H$$

where L denotes the number of clusters (e.g., scatterers, reflectors, objects, etc.) in the environment, $N_r$ denotes the number of receive antennas in the antenna array, $N_t$ denotes the number of transmit antennas in the antenna array, $\alpha_\ell$ is the cluster gain for a given cluster, $a_R(\theta_R, \ell, \phi_R, \ell)$ is the receiver side array steering vector for the receive antennas of the cluster, and $a_T(\theta_T, \ell, \phi_T, \ell)$ is the transmit side array steering vector. In this regard, for example, an array gain of the antenna array using a certain number of clusters, receive antennas, and transmit antennas, with rank-1 beamforming at both ends, can be represented as:

$$\text{Array gain} = |g^H H f|^2 \Rightarrow \text{Rate} = \log_2(1 + \rho \cdot |g^H H f|^2)$$

where f and g are unit-norm beamforming vectors at the base station 105 and UE 115, and ρ is a pre-beamforming signal-to-noise ratio. In this example, effective rate determining component 352 can use a utility function to translate RF power to rate for comparing with a desired rate for communications. In an example, RF power with an $N_t$ element antenna array can be increasing with $N_t$, as described, and the antenna array may have a baseline power consumption (also referred to herein as $U_0$) that is independent of how many antennas are used or activated for wireless communications. Where the utility function can be represented by U(RF power), the effective data rate can be defined in one or more measurements of data rate per unit of time per RF power (e.g., bits/sec/mW, which can correspond to bits/millijoule (mJ)), as:

$$\text{Effective Rate} = \frac{\log_2(1 + \rho \cdot |g^H H f|^2)}{U(RF \text{ power})}$$

In other examples, effective rate determining component 352 may receive an indication of the effective data rate and/or one or more parameters from the formulas above, from a UE 115, one or more other base station 105 (e.g., over a backhaul), from a network device in network 310, etc. In another example, effective rate determining component 352 can store the formula or algorithm for determining the effective rate, the number of antennas (and/or which of the antennas to use, etc.) based on the effective rate, and/or the like.

In one example, determining the number of antennas at Block 502 can also optionally include, at Block 506, determining the utility function based at least in part on a baseline power consumption of the antenna array, or an incremental power consumption associated with the RF components activated by use of the number of antennas. In an aspect, effective rate determining component 342, e.g., in conjunction with processor(s) 305, memory 302, transceiver 370, communicating component 340, antenna array 373, 400, etc., can determine the utility function based at least in part on the baseline power consumption of the antenna array, or the incremental power consumption associated with the RF components activated by use of the number of antennas. In one example, as described, effective rate determining component 342 may receive these parameters in a communication from one or more network nodes. In another example, however, effective rate determining component 342 can determine the utility function for a number of antennas as follows. Assuming K antennas can be controlled by one RFIC on the antenna array 373, 400, with 1, 2, . . . , K antennas per RFIC consumes $U_1, \ldots, U_K$ milliamperes (mA) in terms of current, and there may be different values $U_1, \ldots, U_K$ depending on whether the base station 105 is transmitting or receiving. In this example utility function U(RF power with $N_t$ antennas)=$U_0$+(# of RFICs)·$U_K$+$U_M$, corresponding to a maximum set of K antennas controlled per RFIC and $N_t$=(# of RFICs)* K+M with 1≤K≤M, and where $U_0$ is the baseline power of the antenna array and $U_M$ is an incremental power consumption associated with RFICs activated by use of the number of antennas of the antenna array.

Thus, in one example, in determining the number of antennas (e.g., at Block 502), the antenna selecting component 344 can determine a functional f(.) corresponding to the an antenna array size, which may correspond to:

$$N_t^* = \arg\max_{N_t \in [1, N_t^{max}]} f(\{\text{Effective Rate}_i\})$$

where the base station 105/CPE can be equipped with up to $N_t^{max}$ antennas, $N_t^*$ can be a number of antennas from 1 to $N_t^{max}$, and a desirable or an optimal number can depend on L, the channel structure (e.g., angular spread, fading statistics, etc.), pre-beamforming SNR, and/or U(.). Accordingly, in this example, antenna selecting component 344 can determine the number of antennas based at least in part on the determined effective rate.

Additionally, for example, antenna selecting component 344 may determine when to utilize the determined number of antennas (e.g., where the number of antennas can be determined as described above or otherwise specified/indicated to the base station 105). For example, determining when to use the reduced number of antennas may correspond to coordinating (e.g., scheduling), with one or more other base stations, times for utilizing a reduced set of antennas, detecting certain parameters, conditions, etc. In this regard, for example, base station 105 may not always use a reduced subset of antennas of the antenna array for the wireless communications.

For example, determining the number of antennas at Block 502 may optionally include, at Block 508, coordinating the number of antennas based on receiving a different number of antennas used by one or more other access points. In an aspect, backhaul component 346 (and/or communicating component 340), e.g., in conjunction with processor(s) 305, memory 302, transceiver 370, etc., can receive an indication (e.g., over a backhaul link) of a different number of antennas used by the one or more other access points, and antenna selecting component 344 can accordingly determine whether to use the subset of antennas in the antenna array (as opposed to all antennas in the antenna array) based on the received indication. In an example, the base station 105 and other access point can coordinate or schedule periods of time during which each of the base station 105 or other access points can use a subset of all available antennas in their corresponding antenna arrays. For example, the access points can coordinate in a round-robin pattern or via other approaches, which may be based on one or more parameters of the base stations such as to determine an order (e.g., an identifier of the base station where the base stations can determine time periods in descending order based on the identifier, etc.). An instantiation of this parameter could include hard-coding an order for different base stations. Another instantiation could include a base station array size to coverage area and time mapping function that allows the determination of the precise times at which different base stations are used. An example is shown in FIG. 6.

Figure 6:
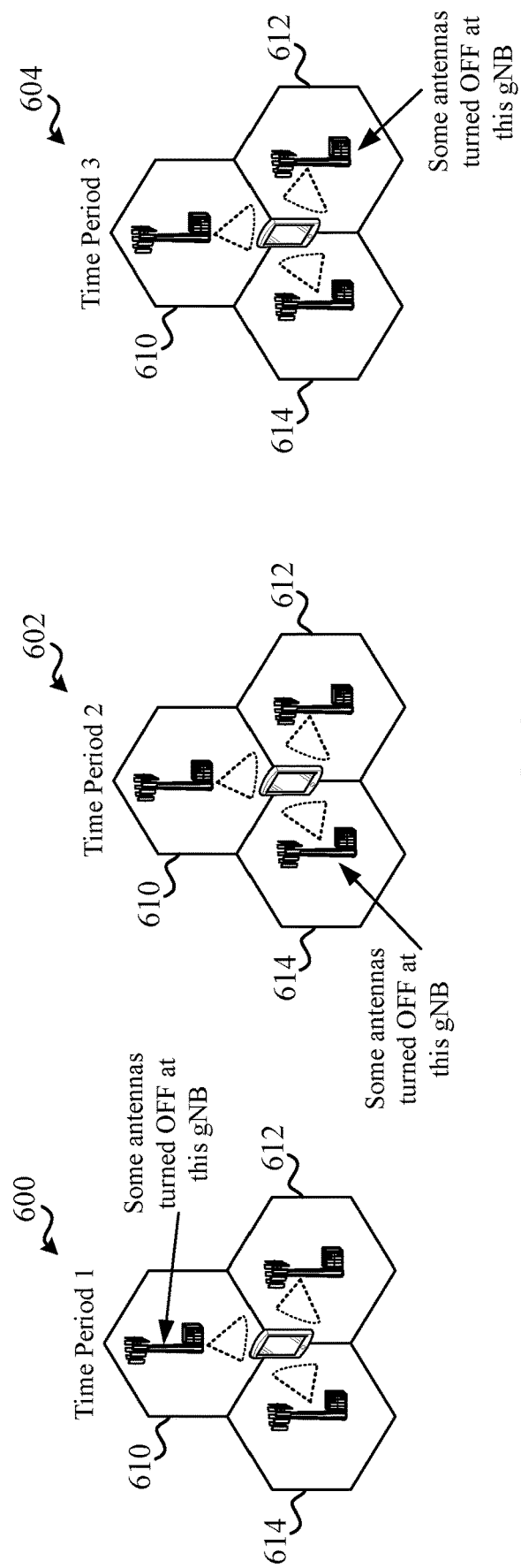
FIG. 6 is a block diagram illustrating examples of base station communications in different time periods, in accordance with various aspects of the present disclosure.

FIG. 6 illustrates examples 600, 602, 604 of network configurations of base stations at different time periods. For example, base stations 610, 612, 614 can operate near one another, and can communicate (e.g., over a backhaul) to coordinate when to use a subset of all antennas in their respective antenna arrays at different time periods, as described in relation to Block 508 in FIG. 5. For example, base stations 610, 612, 614 may negotiate with one another (e.g., over a backhaul) for time periods during which to use a subset of antennas. For example, in time period 1, in example 600, base stations 610, 612, 614 may coordinate such that base station 610 utilizes a subset of antennas in its antenna array (e.g., such that some antennas are turned off) while the other base stations 612, 614 transmit using all antennas in their antenna arrays for the time period 1. In time period 2, in example 602, base stations 610, 612, 614 may coordinate such that base station 614 utilizes a subset of antennas in its antenna array (e.g., such that some antennas are turned off) while the other base stations 610, 612 transmit using all antennas in their antenna arrays for the time period 2. In time period 3, in example 604, base stations 610, 612, 614 may coordinate such that base station 612 utilizes a subset of antennas in its antenna array (e.g., such that some antennas are turned off) while the other base stations 610, 614 transmit using all antennas in their antenna arrays for the time period 3. The base stations 610, 612, 614 may continue this pattern in subsequent time periods, and may accordingly optimize array sizes for energy and spectral efficiencies.

For example, the length, start time, etc. of the time periods can be negotiated among the base stations 610, 612, 614 as well. Moreover, in an example, negotiations may allow more than one base station to use a subset of antennas at a time. In an example, the subsets of antennas can be used by each base station 610, 612, 614 in the corresponding time period to transmit SS blocks with increased beamwidth and decreased coverage, such to allow monitoring UEs 115 in an expanded beamwidth to more readily detect the base station transmitting SS blocks using a subset of antennas in the corresponding time period. Negotiating the time periods for using the subset of antennas in this regard may result in improved user experience where the network is over-densified with base stations, or has a low UE density, during times or areas of non-peak rate/traffic, where low data payloads are to be communicated at the base stations, etc.

Referring back to FIG. 5, determining the number of antennas at Block 502 may also optionally include, at Block 510, determining to use the number of antennas based on one or more parameters or detected conditions. In an aspect, antenna selecting component 344, e.g., in conjunction with processor(s) 305, memory 302, transceiver 370, etc., can determine to use the number of antennas based on the one or more parameters or detected conditions. For example, antenna selecting component 344 can detect the one or more parameters or conditions, such as a network load or signal strength, achieving a threshold, which may indicate an over-densified network, a load or signal strength of UEs achieving (or failing to achieve) a threshold, which may indicate low UE density, a time of day, day of week, etc. indicative of peak hours of network usage, a payload of data to be transmitted by the base station 105, and/or the like. Antenna selecting component 344 can use this information in determining to use the subset of the antennas (e.g., as opposed to all antennas) to provide more desirable network conditions/usage. For example, in conditions such as high network load, high network signal strength, a detected low load of UEs. UEs failing to achieve a threshold signal strength, a peak time of day, day of week, etc., antenna selecting component 344 can determine to use a selected subset of antennas in certain time periods, negotiate the time periods with nearby base stations, etc., as described.

At Block 512, the number of antennas can be indicated, over a backhaul connection, to one or more other access points to coordinate using the number of antennas. In an aspect, backhaul component 346, e.g., in conjunction with processor(s) 305, memory 302, transceiver 370, communicating component 340, etc., can indicate, over the backhaul connection (e.g., backhaul link 134), the number of antennas to one or more other access points to coordinate using the number of antennas. As described, for example, backhaul component 346 can indicate the number of antennas being used and/or the time at which the base station 105 plans to use the number of antennas in an effort to coordinate reduced antenna usage among base stations/access points, as described with reference to FIG. 6. Moreover, indicating the number of antennas may include indicating an integer number of antennas, identifying the antennas being used (e.g., based on an antenna identifier, which may include an identifier of a corresponding module), identifying beamforming parameters of the antennas being used, and/or the like.

At Block 514, one or more devices in a wireless network can be communicated with by using the number of antennas. In an aspect, communicating component 340, e.g., in conjunction with processor(s) 305, memory 302, transceiver 370, etc., can communicate, using the number of antennas, with one or more devices in the wireless network, such as one or more UEs 115, one or more other base stations, etc. Using the number of antennas (e.g., as opposed to all antennas in the antenna array 373, 400) may allow for decreasing power consumption, increasing beamwidth, etc., which may be desirable in certain network deployments, as described.

In an example, in using the one or more antennas (e.g., at Block 514), communicating component 340 can terminate power to at least certain parts of RF circuitry for the antennas of the antenna array that are not included in the selected subset of antennas. This can result in actual power consumption savings. For example, this can be distinguished from merely setting beam weights to zero in an antenna code book for the antenna array, which may result in these antennas not being used, but they may still be powered (e.g., the voltage controlled oscillator (VCO), variable gain amplifiers (VGAs), etc., may still be powered in these scenarios). Thus, for example, the examples described herein rather than using codebook adaptations, may terminate or result in turning off power to parts of the RF circuitry associated with the antennas, though the examples are not limited to such functions.

Figure 7:
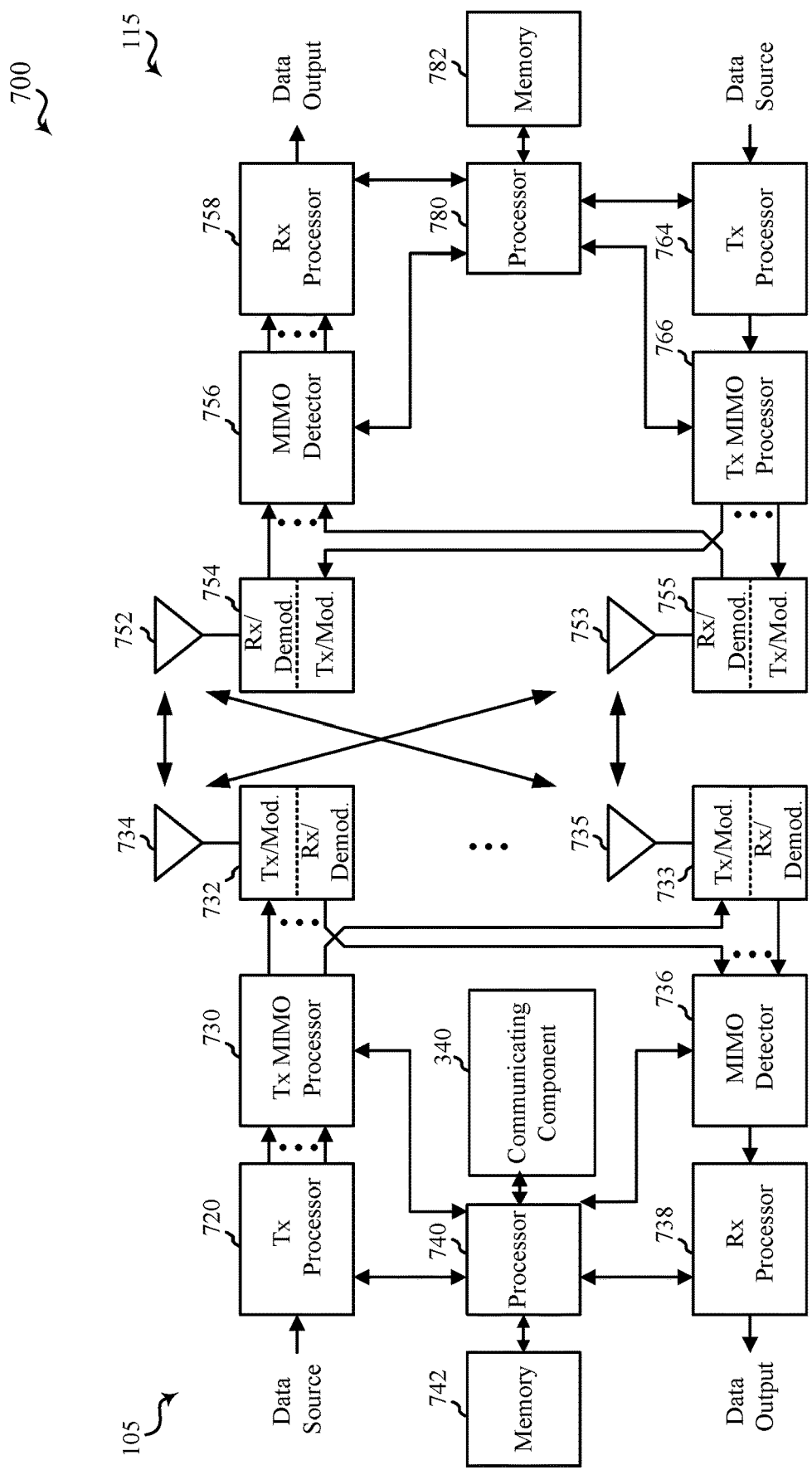
FIG. 7 is a block diagram illustrating an example of a MIMO communication system including a base station and a UE, in accordance with various aspects of the present disclosure.

FIG. 7 is a block diagram of a MIMO communication system 700 including a base station 105 and a UE 115. The MIMO communication system 700 may illustrate aspects of the wireless communication system 100 described with reference to FIG. 1. The base station 105 may be an example of aspects of the base station 105 described with reference to FIGS. 1-3. The base station 105 may be equipped with antennas 734 and 735, and the UE 115 may be equipped with antennas 752 and 753. In the MIMO communication system 700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 115 may be an example of aspects of the UEs 115 described with reference to FIGS. 1-3. At the UE 115, the UE antennas 752 and 753 may receive the DL signals from the base station 105 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 115 to a data output, and provide decoded control information to a processor 780, or memory 782.

On the uplink (UL), at the UE 115, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 105 in accordance with the communication parameters received from the base station 105. At the base station 105, the UL signals from the UE 115 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a communicating component 340 (see e.g., FIGS. 1-3).

The components of the UE 115 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for configuring a number of antennas in an antenna array to use in communicating in a wireless network, comprising:
    determining, by an access point coupled to the antenna array, a selection of a number of antennas of the antenna array to provide power such to achieve a radio frequency (RF) power level that results in a certain effective data rate for communicating in the wireless network, wherein the selection is less than all available antennas in the antenna array;
    indicating, by the access point over a backhaul connection to one or more other access points of the wireless network, the number of antennas in the selection that are provided power and not including a second number of antennas of the antenna array to which power is terminated, to coordinate using of the number of antennas among the access point and the one or more other access points in communicating with one or more devices at a determined time; and
    communicating, using the number of antennas, with the one or more devices in the wireless network.

2. The method of claim 1, further comprising determining the certain effective data rate as a function of at least a computed beamforming or array gain with the number of antennas in the antenna array and a utility function of the RF power consumed in transmission or reception with the number of antennas in the antenna array.

3. The method of claim 2, further comprising determining the utility function of the RF power based at least in part on an individual RF power of RF components in RF circuitry activated by the number of antennas in the antenna array.

4. The method of claim 3, wherein determining the utility function is further based at least in part on a baseline power consumption independent of the number of antennas used.

5. The method of claim 3, wherein determining the utility function is further based at least in part on an incremental power consumption associated with the RF components activated by the number of antennas.

6. The method of claim 2, further comprising computing the computed beamforming or array gain based at least in part on a channel matrix with the one or more devices.

7. The method of claim 1, wherein determining the number of antennas is based at least in part on receiving an indication of a different number of antennas used by the one or more other access points at the determined time as part of coordinating the number of antennas used.

8. The method of claim 1, wherein determining the number of antennas is based at least in part on receiving an indication of a network density from the one or more other access points.

9. The method of claim 1, wherein determining the number of antennas is based at least in part on determining a device density including the one or more devices.

10. The method of claim 1, wherein determining the number of antennas is based at least in part on determining a time of day related to communicating with the one or more devices.

11. The method of claim 1, wherein determining the number of antennas is based at least in part on determining a payload of traffic to be communicated to the one or more devices.

12. The method of claim 1, wherein the one or more devices include one or more user equipment or access points.

13. The method of claim 1, wherein at least one of the antennas of the antenna array comprises an antenna element.

14. An apparatus for wireless communication, comprising:
a transceiver for communicating in a wireless network via a number of antennas in an antenna array;
a memory configured to store instructions; and
one or more processors communicatively coupled with the transceiver and the memory, wherein the one or more processors are configured to:
determine a selection of a number of antennas of the antenna array to provide power such to achieve a radio frequency (RF) power level that results in a certain effective data rate for communicating in the wireless network, wherein the selection is less than all available antennas in the antenna array;
indicate, over a backhaul connection to one or more other access points of the wireless network, the number of antennas in the selection that are provided power and not including a second number of antennas of the antenna array to which power is terminated, to coordinate using of the number of antennas among the apparatus and the one or more other access points in communicating with one or more devices at a determined time; and
communicate, using the number of antennas, with the one or more devices in the wireless network.

15. The apparatus of claim 14, wherein the one or more processors are further configured to determine the certain effective data rate as a function of at least a computed beamforming or array gain with the number of antennas in the antenna array and a utility function of the RF power consumed in transmission or reception with all the number of antennas in the antenna array.

16. The apparatus of claim 15, wherein the one or more processors are further configured to determine the utility function of the RF power based at least in part on an individual RF power of RF components activated by the number of antennas in the antenna array.

17. The apparatus of claim 16, wherein the one or more processors are configured to determine the utility function further based at least in part on a baseline power consumption independent of the number of antennas.

18. The apparatus of claim 16, wherein the one or more processors are further configured to determine the utility function further based at least in part on an incremental power consumption associated with the RF components activated by the number of antennas.

19. The apparatus of claim 15, wherein the one or more processors are further configured to compute the beamforming or array gain based at least in part on a channel matrix with the one or more devices.

20. The apparatus of claim 14, wherein the one or more processors are configured to determine the number of antennas based at least in part on receiving an indication of a different number of antennas used by the one or more other access points at the determined time as part of coordinating the number of antennas used.

21. The apparatus of claim 14, wherein the one or more processors are configured to determine the number of antennas based at least in part on receiving an indication of a network density from the one or more other access points.

22. The apparatus of claim 14, wherein the one or more processors are configured to determine the number of antennas based at least in part on determining a device density including the one or more devices.

23. The apparatus of claim 14, wherein the one or more processors are configured to determine the number of antennas based at least in part on determining a time of day related to communicating with the one or more devices.

24. The apparatus of claim 14, wherein the one or more processors are configured to determine the number of antennas based at least in part on determining a payload of traffic to be communicated to the one or more devices.

25. The apparatus of claim 14, wherein the one or more devices include one or more user equipment or access points.

26. An apparatus including an antenna array and for configuring a number of antennas in the antenna array to use in communicating in a wireless network, comprising:
means for determining a selection of a number of antennas of the antenna array to provide power such to achieve a radio frequency (RF) power level that results in a certain effective data rate for communicating in the wireless network, wherein the selection is less than all available antennas in the antenna array;
means for indicating, over a backhaul connection to one or more other access points of the wireless network, the number of antennas in the selection that are provided power and not including a second number of antennas of the antenna array to which power is terminated, to one or more other access points of the wireless network to coordinate using of the number of antennas among the apparatus and the one or more other access points in communicating with one or more devices at a determined time; and
means for communicating, using the number of antennas, with the one or more devices in the wireless network.

27. The apparatus of claim 26, further comprising means for determining the certain effective data rate as a function of at least a computed beamforming or array gain with the number of antennas in the antenna array and a utility function of the RF power consumed in transmission or reception with all the number of antennas in the antenna array.

28. The apparatus of claim 27, further comprising means for determining the utility function of the RF power based at least in part on an individual RF power of RF components activated by the number of antennas in the antenna array.

29. A non-transitory computer-readable medium, comprising code executable by one or more processors for configuring a number of antennas in an antenna array to use in communicating in a wireless network, the code comprising:
code for determining, by an access point that is coupled to the antenna array, a selection of a number of antennas of the antenna array to provide power such to achieve a radio frequency (RF) power level that results in a certain effective data rate for communicating in the wireless network, wherein the selection is less than all available antennas in the antenna array;
code for indicating, by the access point over a backhaul connection to one or more other access points of the wireless network, the number of antennas in the selection that are provided power and not including a second number of antennas of the antenna array to which power is terminated, to one or more other access points of the wireless network to coordinate using of the number of antennas among the access point and the one or more other access points in communicating with one or more devices at a determined time; and code for communicating, using the number of antennas, with the one or more devices in the wireless network.

30. The non-transitory computer-readable medium of claim 29, further comprising code for determining the certain effective data rate as a function of at least a computed beamforming or array gain with the number of antennas in the antenna array and a utility function of the RF power consumed in transmission or reception with all the number of antennas in the antenna array.

31. The non-transitory computer-readable medium of claim 30, further comprising code for determining the utility function of the RF power based at least in part on an individual RF power of RF components activated by the number of antennas in the antenna array.

* * * * *